(12) United States Patent
Kanemori et al.

(10) Patent No.: US 9,701,345 B2
(45) Date of Patent: Jul. 11, 2017

(54) SIDE VEHICLE-BODY STRUCTURE OF AUTOMOTIVE VEHICLE

(71) Applicant: MAZDA MOTOR CORPORATION, Hiroshima (JP)

(72) Inventors: Masahide Kanemori, Aki-gun (JP); Nobuyuki Nakayama, Aki-gun (JP); Akihiro Kawano, Hiroshima (JP); Hideyuki Tsukamoto, Hiroshima (JP); Soukichi Kikuchi, Higashihiroshima (JP); Takashi Hamada, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 15/044,575

(22) Filed: Feb. 16, 2016

(65) Prior Publication Data

US 2016/0244098 A1    Aug. 25, 2016

(30) Foreign Application Priority Data

Feb. 25, 2015    (JP) .................................. 2015-034794

(51) Int. Cl.
  *B62D 7/22* (2006.01)
  *B62D 21/15* (2006.01)
  *B60G 3/06* (2006.01)
  *B60G 7/02* (2006.01)

(52) U.S. Cl.
  CPC ............. *B62D 21/152* (2013.01); *B60G 3/06* (2013.01); *B60G 7/02* (2013.01); *B60G 2204/1431* (2013.01); *B60G 2206/016* (2013.01)

(58) Field of Classification Search
  CPC ...... B62D 21/00; B62D 25/025; B62D 25/04; B62D 29/008

USPC ............ 280/781, 784, 124.134; 296/187.12, 296/187.9, 203.2, 203.3, 193.06
See application file for complete search history.

(56) References Cited

U.S. PATENT DOCUMENTS

| | | | | |
|---|---|---|---|---|
| 6,866,115 B2* | 3/2005 | Miyasaka | ............... | B60R 19/00 180/311 |
| 6,938,950 B2* | 9/2005 | Nagafuchi | ........... | B62D 25/082 296/187.09 |
| 8,215,706 B2* | 7/2012 | Ohta | ...................... | B60J 5/0427 296/146.6 |
| 8,596,711 B2* | 12/2013 | Yasui | ..................... | B60R 19/34 296/187.09 |
| 9,056,633 B2* | 6/2015 | Lohmann | ............. | B62D 25/025 |
| 9,067,627 B2 | 6/2015 | Hara | | |
| 9,126,629 B2* | 9/2015 | Gilbert | .................. | B62D 21/00 |
| 9,517,741 B2* | 12/2016 | Watterworth | .......... | B62D 21/15 |

(Continued)

FOREIGN PATENT DOCUMENTS

JP    2014-144658 A    8/2014

*Primary Examiner* — Toan To
(74) *Attorney, Agent, or Firm* — Studebaker & Brackett PC

(57) ABSTRACT

A reinforcement is configured to have a corner portion corresponding to a corner portion of a side sill inner. Herein, the corner portion of the reinforcement forms a reinforcement ridgeline extending in a vehicle longitudinal direction. The reinforcement is provided such that the reinforcement ridgeline and a side-sill-inner upper ridgeline formed at a corner portion of the side sill inner overlap with each other over a range from a specified area where a wheel outward displaced in a vehicle collision is capable of contacting a side sill to a connection portion where a cross member connects to the side sill inner.

8 Claims, 14 Drawing Sheets

(56) References Cited

U.S. PATENT DOCUMENTS

| | | | | |
|---|---|---|---|---|
| 9,533,712 | B2* | 1/2017 | Panganiban | B62D 25/16 |
| 2002/0008375 | A1* | 1/2002 | Iyanagi | B62D 21/152 |
| | | | | 280/784 |
| 2012/0248825 | A1* | 10/2012 | Tamura | B62D 25/04 |
| | | | | 296/209 |
| 2015/0321700 | A1* | 11/2015 | Onoda | B62D 27/02 |
| | | | | 296/187.09 |
| 2016/0052554 | A1* | 2/2016 | Ozawa | B62D 21/152 |
| | | | | 296/187.09 |

* cited by examiner

SIDE VEHICLE-BODY STRUCTURE OF AUTOMOTIVE VEHICLE

BACKGROUND OF THE INVENTION

The present invention relates to a side vehicle-body structure of an automotive vehicle, in which a wheel is configured to be displaced outward relative to a side sill by a swing action of a wheel support member, such as an arm, when an object collides with the wheel.

FIG. 14 is an explanatory diagram which shows a move of a conventional automotive vehicle when an object collides with a wheel of the vehicle, in which a wheel hits against a tip of a side sill. In a narrow-range collision (hereafter, referred to as a "small overlap collision") in which the vehicle has a head-on collision at a range of 25% or less from an outward end, in a vehicle width direction, of a vehicle body toward a vehicle-body center in a front view, in order to suppress interference (contact) of a wheel 100 with a tip of a side sill 101 as shown in FIG. 14, it may be required to displace the wheel 100 outward relative to the side sill 101 by using a swing action of an arm 102 so that it can be prevented or relieved that the tip of the side sill 101 and the wheel 100 interfere (contact) with each other, thereby properly suppressing longitudinal deformation of a vehicle compartment.

In this case, the following situation has been found. That is, the wheel having been displaced outward relative to the side sill pushes the side sill laterally from vehicle outside with some pressing force, so that load on a connection portion of the side sill extending in the vehicle longitudinal direction and a cross member provided to extend in the vehicle width direction and connect to the side sill increases. Accordingly, it may be required to increase the rigidity of the connection portion of the cross member and the side sill so as to suppress the deformation of the vehicle compartment.

U.S. Pat. No. 9,067,627 discloses a vehicle-body front structure which comprises a pair of right-and-left lower arms which support right-and-left front wheels, a first lateral member which interconnects respective rear-side support portions of the right-and-left lower arms provided at a vehicle body, a second lateral member which interconnects respective front-end-side portions of a pair of right-and-left side sills, and a connection structure which integrally connects the first lateral member and the second lateral member, whereby a lateral load can be generated via the lower arms in the small overlap collision.

According to the conventional structure disclosed in the above-described patent document, however, the first and second lateral members and their connection structure may increase the weight of the vehicle body improperly, and also the above-described patent document refers to nothing about the above-described situation where the wheel having been displaced outward relative to the side sill pushes the side sill laterally from the vehicle outside with some pressing force.

Meanwhile, Japanese Patent Laid-Open Publication No. 2014-144658 discloses a vehicle-body front structure which comprises a sub frame which supports lower arms constituting a suspension and a protruding member which is provided at a front end portion of the sub frame to protrude outward beyond the sub frame and configured to press a front portion side of a front wheel such that when a load is inputted from vehicle front side, the protruding member is moved rearward by the inputted load and a rear portion side of the front wheel is moved outward, whereby the front wheel can be moved outward in the small overlap collision.

The above-described second patent document, however, discloses nothing about the situation where the wheel having been displaced outward relative to the side sill pushes the side sill laterally from vehicle outside with some pressing force, either.

SUMMARY OF THE INVENTION

Accordingly, an object of the present invention is to provide a side vehicle-body structure of an automotive vehicle which can properly suppress the longitudinal deformation of the vehicle compartment by receiving the wheel at a side face of the side sill, not at a face of the tip of the side sill, in the small overlap collision and also suppress inward deformation of the vehicle compartment by making the vehicle body laterally slide relative to a collision object by using a reaction force of receiving the wheel at the side face of the side sill.

The present invention is a side vehicle-body structure of an automotive vehicle, in which a wheel is configured to be displaced outward relative to a side sill when a support member which supports the wheel at a vehicle body swings rearward in a vehicle collision, the side vehicle-body structure comprising a side sill inner forming an inward-side member of the side sill, the side sill inner being configured to have a corner portion extending in a vehicle longitudinal direction which is formed by an upper side portion and a vertical side portion thereof, the corner portion of the side sill inner forming a side-sill-inner upper ridgeline extending in the vehicle longitudinal direction, a cross member provided to extend in the vehicle width direction and connecting to a portion of the side sill inner at an outward-side end thereof, and a reinforcement provided at an upper portion of an outward side face, in a vehicle width direction, of the side sill inner along the corner portion of the side sill inner, wherein the reinforcement is configured to have a corner portion corresponding to the corner portion of the side sill inner, the corner portion of the reinforcement forming a reinforcement ridgeline extending in the vehicle longitudinal direction, and the reinforcement is provided such that the reinforcement ridgeline formed at the corner portion of the reinforcement and the side-sill-inner upper ridgeline formed at the corner portion of the side sill inner overlap with each other over a range from a specified area where the wheel outward displaced in the vehicle collision is capable of contacting the side sill to a connection portion where the cross member connects to the side sill inner. The above-described support member may be a suspension arm or a shock absorber, and the above-described vehicle body may be a front side frame, a sub frame fixedly connected to the front side frame, or a strut tower.

According to the present invention, since the reinforcement is provided such that the reinforcement ridgeline formed at the corner portion of the reinforcement and the side-sill-inner upper ridgeline formed at the corner portion of the side sill inner overlap with each other over the range from the specified area where the wheel outward displaced in the vehicle collision is capable of contacting the side sill to the connection portion where the cross member connects to the side sill inner, the shearing rigidity of the above-described range from the specified area to the cross-member connection portion can be increased. Accordingly, in addition to suppressing the longitudinal deformation of the vehicle body by receiving the wheel at the side face of the side sill, not at the face of the tip of the side sill, in the small overlap collision, the inward deformation of the vehicle compartment can be suppressed by making the vehicle body laterally slide relative to the collision object by using the reaction force of receiving the wheel at the side face of the side sill.

In an embodiment of the present invention, another reinforcement is provided to extend from a front end portion of the side sill to a front end portion of the reinforcement such that a closed cross section extending in the vehicle longitudinal direction is formed between the other reinforcement and the side sill inner.

According to this embodiment, the longitudinal proof stress of the side sill inner can be increased by the closed cross section which is formed between the side sill inner and the other reinforcement.

In another embodiment of the present invention, the reinforcement and the other reinforcement are connected to each other at the specified area where the wheel outward displaced in the vehicle collision is capable of contacting the side sill.

According to this embodiment, since the reinforcement and the other reinforcement are connected to each other at the specified area, the shearing rigidity can be further increased.

In another embodiment of the present invention, the side sill is configured to have a closed cross section extending in the vehicle longitudinal direction which is formed by the side sill inner and a side sill outer, and a reinforcing portion is provided at the side sill outer such that the reinforcing portion is spaced apart, in the vehicle width direction, from the reinforcement so as to reinforce the closed cross section of the side sill.

According to this embodiment, since the side sill outer is reinforced by the reinforcing portion being spaced apart from the reinforcement, crushing of the closed cross section of the side sill can be controlled with the reinforcement, that is, deformation or crushing of the above-described two overlapped ridgelines can be suppressed, and also absorbing of an impact and producing of a lateral-slide load can be effectively achieved.

In another embodiment of the present invention, the support member comprises an A-shaped lower arm including a lower arm body to support the wheel, a deformation promotion portion which is configured to deform inward when receiving a wheel collision load is provided at an end portion of a central side, in the vehicle longitudinal direction, of the lower arm body such that after a tip-side axial portion is separated from the lower arm or the lower arm breaks in the vehicle collision, the lower arm swings about the vicinity of a central-side axial portion so as to displace the wheel outward relative to the side sill.

According to this embodiment, when the object collides with the wheel in the small overlap collision, the above-described central-side end portion of the lower arm deforms inward because of the deformation promotion portion first, and then the tip-side axial portion is separated from the lower arm or the lower arm breaks. After this, the lower arm swings and thereby the wheel is displaced outward relative to the side sill, so that the lateral load (reaction force) is generated. Thus, when the wheel is displaced outward without being received at the tip of the side sill, the lateral-slide load is generated by the reaction force, so that it is prevented that the collision load is transmitted to the tip of the side sill. Accordingly, in the above-described collision, the wheel can be displaced outward surely, preventing the wheel from hitting against the tip of the side sill, and also the lateral-slide load of the vehicle body is generated, so that the vehicle body can be made to laterally slide relative to the collision object.

Other features, aspects, and advantages of the present invention will become apparent from the following description which refers to the accompanying drawings.

DETAILED DESCRIPTION OF THE INVENTION

Figure 1:
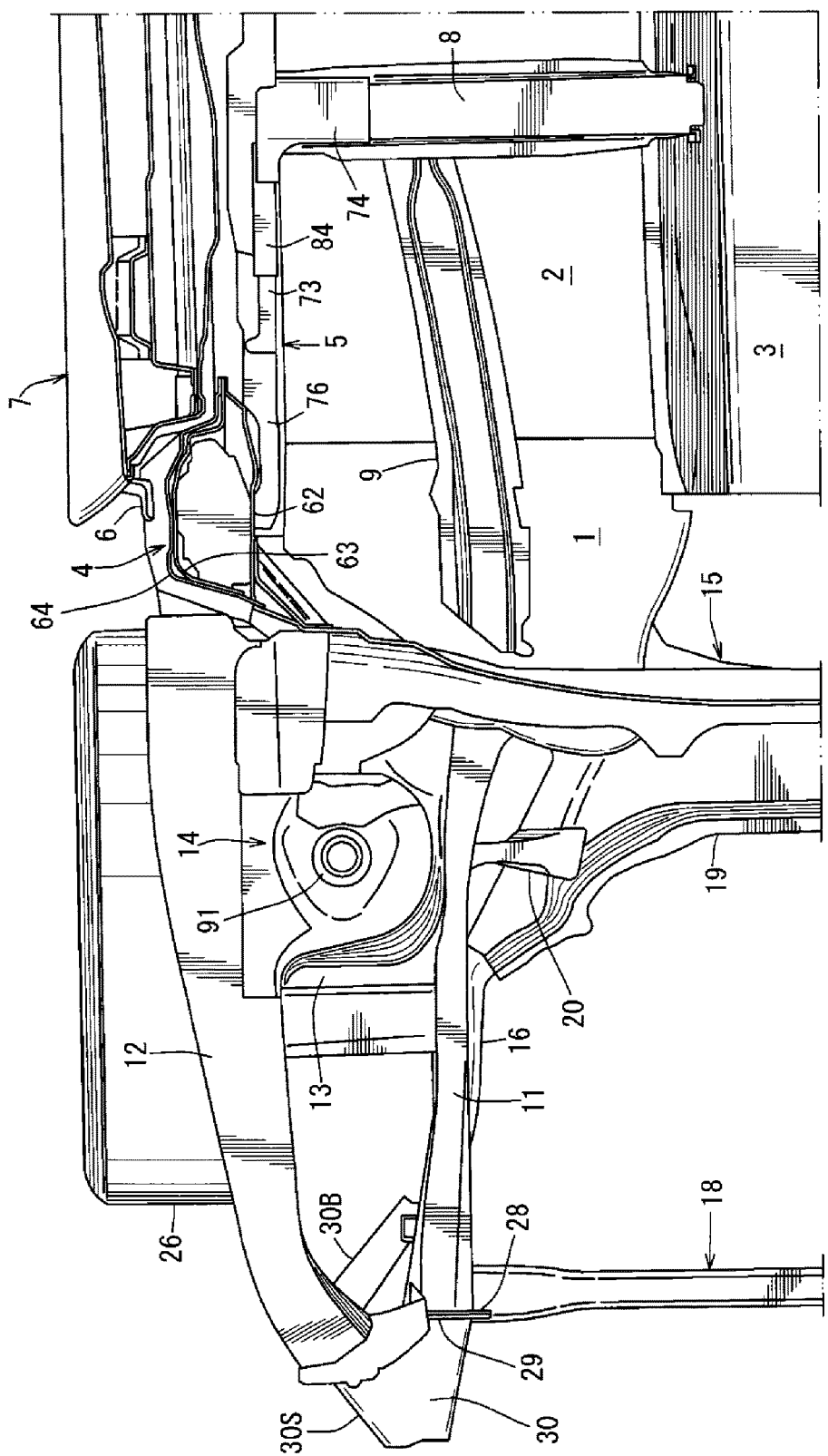
FIG. 1 is a plan view of a side vehicle-body structure of an automotive vehicle of the present invention.
Figure 2:
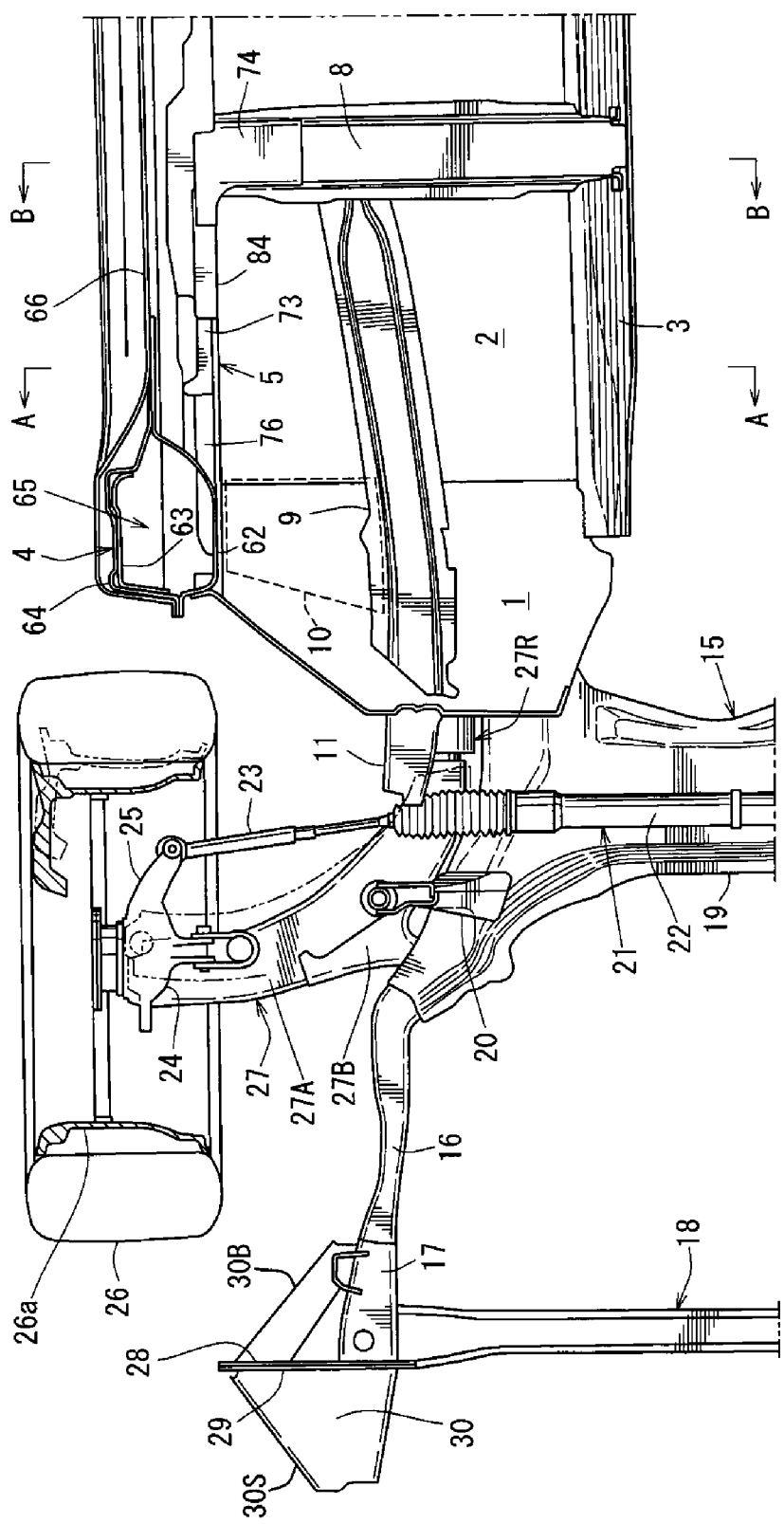
FIG. 2 is a plan view of the side vehicle-body structure, in which an apron reinforcement, a side frame, and a door are removed from a state shown in FIG. 1.
Figure 3:
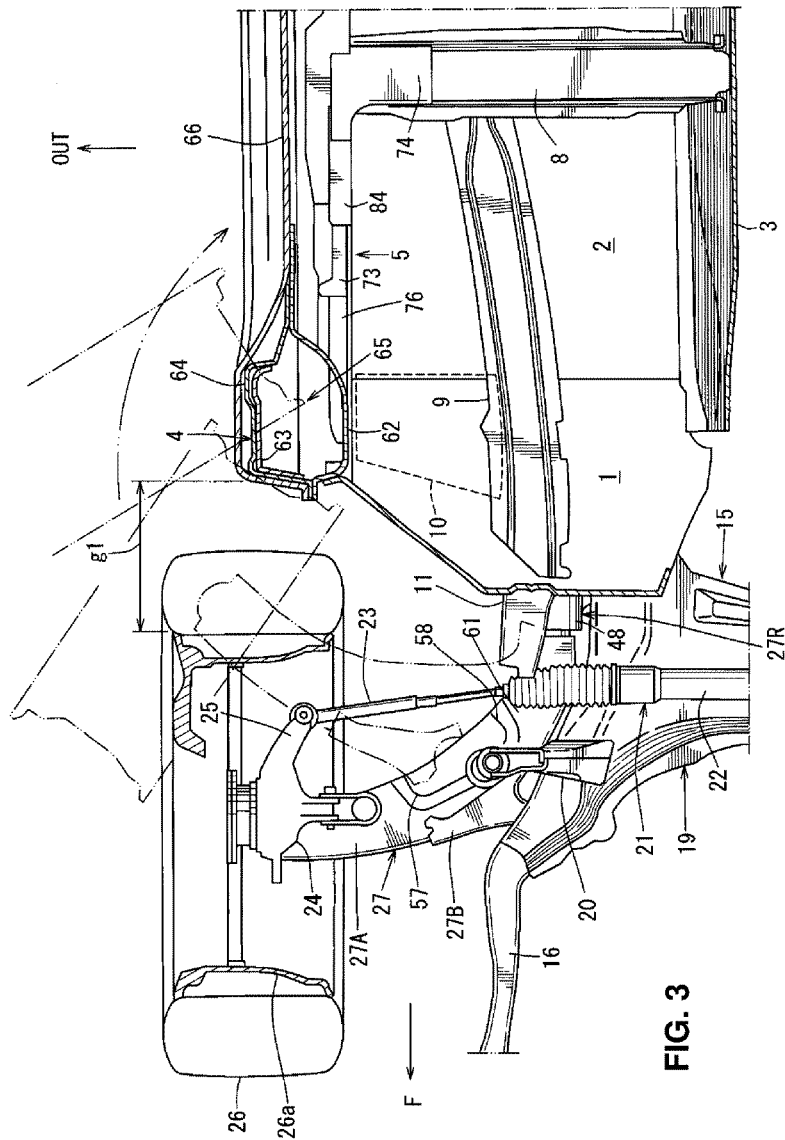
FIG. 3 is an enlarged main-part plan view of FIG. 2.
Figure 4A:
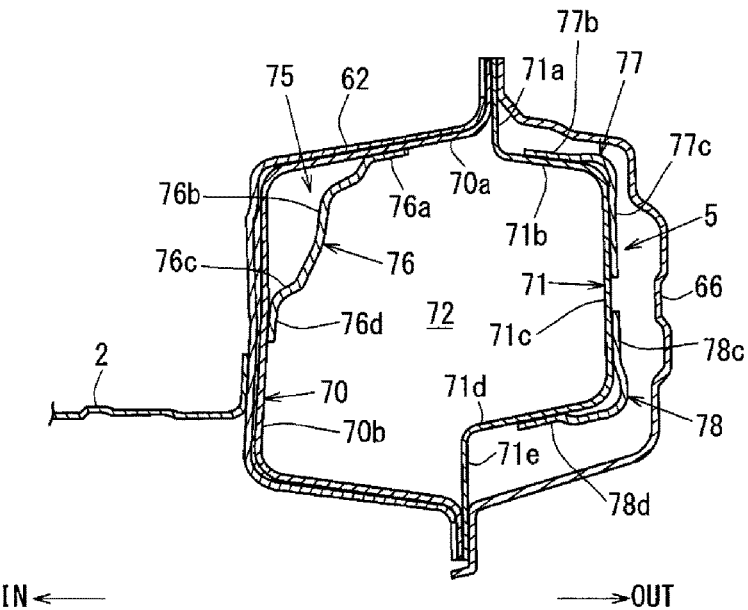
FIG. 4A is a sectional view taken along line A-A of FIG. 2.
Figure 4B:
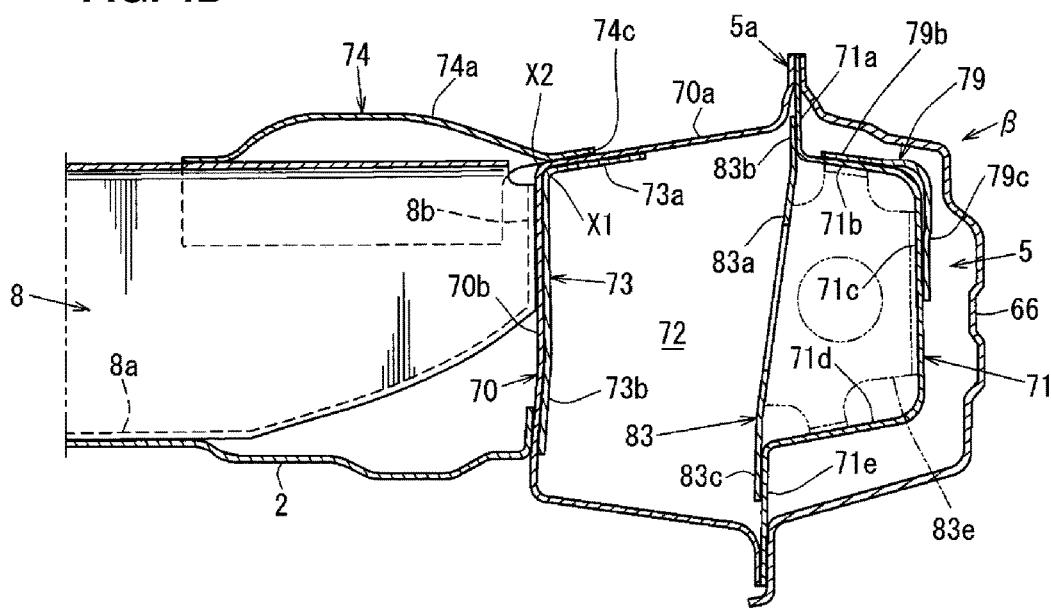
FIG. 4B is a sectional view taken along line B-B of FIG. 2.

Hereafter, an embodiment of the present invention will be described specifically referring to the drawings. The drawings show a side vehicle-body structure of an automotive vehicle, and FIG. 1 is a plan view of the present side vehicle-body structure, FIG. 2 is a plan view of the side vehicle-body structure, in which an apron reinforcement, a side frame, a door and others are removed from a state shown in FIG. 1, FIG. 3 is an enlarged main-part plan view of FIG. 2, FIG. 4A is a sectional view taken along line A-A of FIG. 2, and FIG. 4B is a sectional view taken along line B-B of FIG. 2. The following embodiment exemplifies a side vehicle-body structure at a vehicle front portion as the side vehicle-body structure of the automotive vehicle.

In FIGS. 1, 2 and 3 (herein, illustration of a side sill inner is omitted in FIGS. 1-3), there is provided a dash lower panel (dash panel) 1 which longitudinally partitions an engine room from a vehicle compartment (cabin), a floor panel 2 which extends rearward roughly horizontally is integrally and continuously formed at a rear end of a lower portion of the dash lower panel 1, and a tunnel portion 3 which protrudes toward an inside of the vehicle compartment and extends in a vehicle longitudinal direction is integrally formed at a central portion, in a vehicle width direction, of the floor panel 2.

Further, at right-and-left both end portions of the dash panel 1 are provided hinge pillars 4 which respectively have a closed cross section extending vertically. Meanwhile, at right-and-left both end portions of the floor panel 2 are provided side sills 5 which have a closed cross section extending in the vehicle longitudinal direction. Herein, the hinge pillar 4 and the side sill 5 which are positioned on a vehicle right side only are illustrated in FIGS. 1, 2 and 3.

As shown in FIG. 1, a front door 7 is attached to the hinge pillar 4 via a hinge bracket 6 so as to open and close, and a cross member 8 (a so-called No. 2 cross member) which extends in the vehicle width direction is attached at a central position, in the vehicle longitudinal direction, between the hinge pillar 4 and a center pillar, not illustrated, and between the side sill 5 and the tunnel portion 3. A closed cross section extending in the vehicle width direction is formed between the cross member 8 and the floor panel 2.

Further, as shown in FIGS. 1, 2 and 3, there is provided a floor frame 9 which extends in the vehicle longitudinal direction over the dash lower panel 1 and the floor panel 2, and between this floor frame 9 and the dash panel 1 or the floor panel 2 is formed a closed cross section extending in the vehicle longitudinal direction.

As shown in FIG. 2, a torque box 10 which connects a front end portion of the side sill 5 and a lower portion of the floor frame 9 in the vehicle width direction is provided below the dash lower panel 1.

As shown in FIG. 1, right-and-left front side frames 11 (the right-side one only is illustrated in the figure) which respectively have a closed cross section extending in the vehicle longitudinal direction are provided at right-and-left both sides of the engine room, and a bumper reinforcement (not illustrated) which extends in the vehicle width direction is attached to the right-and-left front side frames 11 respectively via a set plate, an attaching plates and a main crash can.

As shown in FIG. 1, an apron reinforcement 12 which has a closed cross section extending in the vehicle longitudinal direction is provided at a position which is located on an outward side, in the vehicle width direction, of the front side frame 11 and also above the front side frame 11, and between this apron reinforcement 12 and the front side frame 11 are formed a wheel house 13 and a suspension tower portion 14.

As shown in FIGS. 1, 2 and 3, there is provided a sub frame 15 which is positioned below the front side frames 11 and mounts a power train (not illustrated).

As shown in FIG. 2, the sub frame 15 is a rectangular-shaped frame which comprises a pair of longitudinal members 16 extending in the vehicle longitudinal direction at both side portions of the vehicle body, tip members 17 positioned at respective front ends of the longitudinal members 16, a front cross member 18 extending in the vehicle width direction at a front side of the frame, and a rear cross member 19 extending in the vehicle width direction at a rear side of the frame.

Herein, the tip member 17 is configured to have a higher rigidity than the longitudinal member 16. The front cross member 18 serves as a shroud lower as well.

The above-described front cross member 18 may be configured to have a cross section opening downward or to have a closed cross section which is formed by fixedly joining a closing plate to at least part of this open cross section. According to the present embodiment, as shown in the bottom view of FIG. 5, a closing plate 18*b* is joined to a lower portion of a cross member body 18*a* having a hat-shaped cross section so as to have a closed cross section at its substantially whole part, excluding its both end portions.

As shown in FIGS. 1, 2 and 3, a tower portion 20 which rises upward from the rear cross member 19 is provided at a front side of a side end portion, in the vehicle width direction, of the rear cross member 19. The sub frame 15 is attached to a lower portion of the front side frame 11 via this toward portion 20.

As shown in FIGS. 2 and 3, a steering device 21 is configured such that control links 23 are provided at right-and-left both ends (the right-side end is illustrated only in FIGS. 2 and 3) of a rack portion 22, and tips of these control links 23 are coupled to free ends of knuckle arms 25 of steering knuckles 24 via ball joints so as to steer respective front wheels 26. In FIGS. 2 and 3, reference character 27 denotes a lower arm of a front suspension. Herein, the side vehicle-body structure of the automotive vehicle shown in the drawings is configured to be substantially symmetrical.

In FIGS. 1 and 2, a sub crash can 30 which protrudes outward from the sub frame 15 and has an inclined front face extending obliquely rearward and outward (an inclination face portion 30S) is attached to a tip side, i.e., a front end side of the tip member 17 which constitutes the sub frame 15 via a set plate 28 and an attaching plate 29. Further, an inclination member 30B connects an outward end portion, in the vehicle width direction, of the set plate 28 and the tip member 17 of the sub frame 15 which is positioned behind the set plate 28. These are means for transmitting a lateral-slide load to the front end portion of the vehicle body at a stage before the wheel (front wheel 26) being displaced outward in the small overlap collision, i.e., promotion means for making the vehicle laterally slide in the small overlap collision which are provided at a vehicle front portion.

Figure 5:
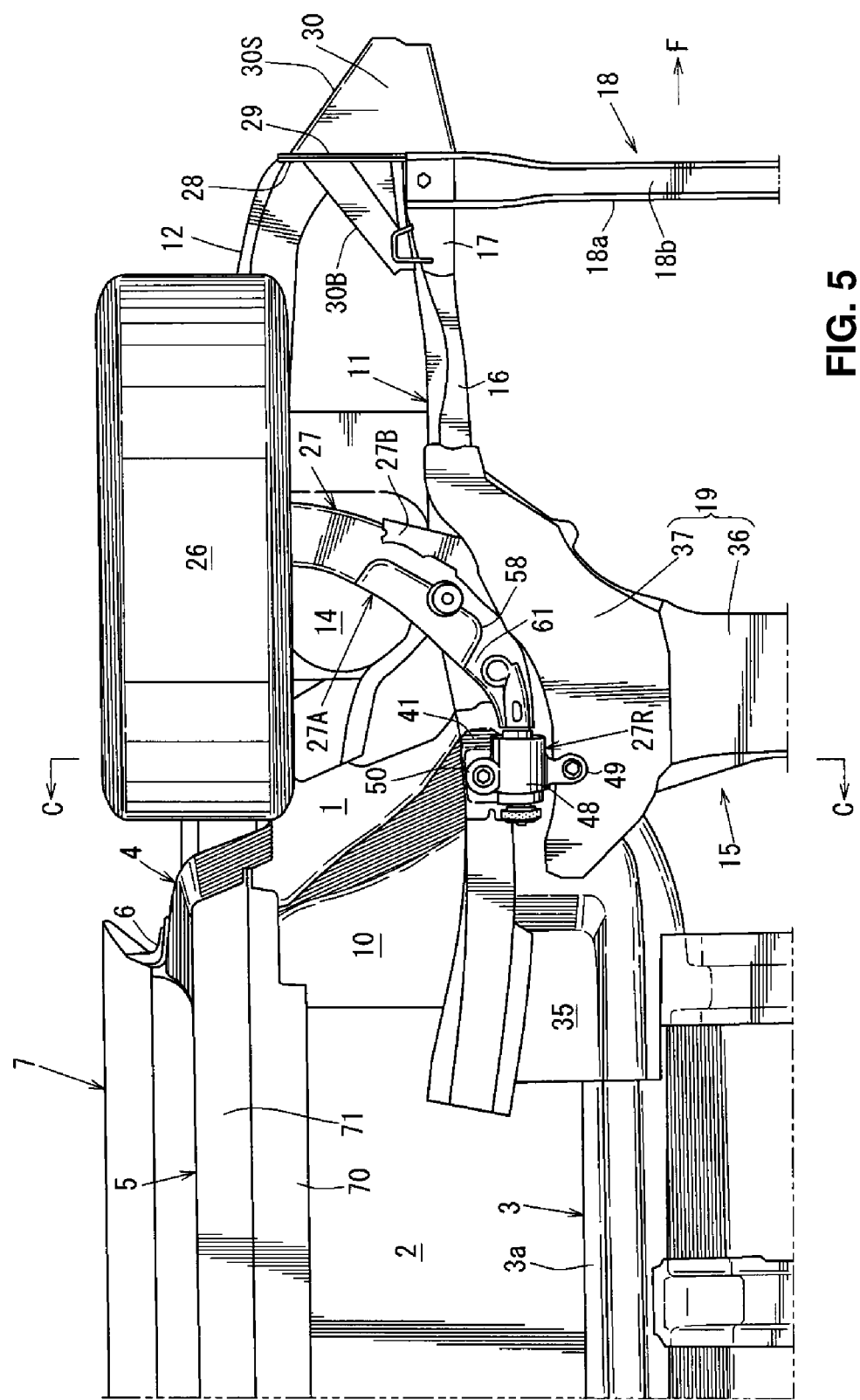
FIG. 5 is an enlarged main-part bottom view of the side vehicle-body structure shown in FIG. 1.
Figure 6:
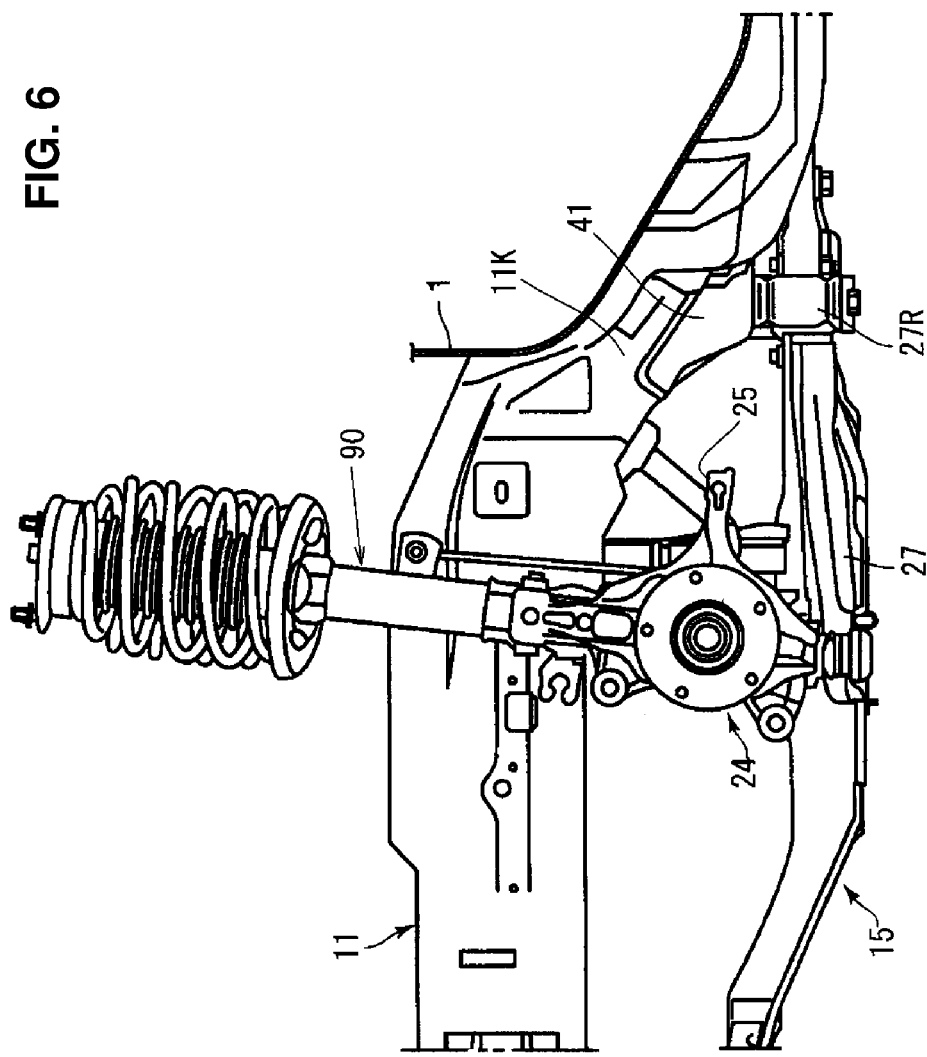
FIG. 6 is a main-part side view of a front suspension.
Figure 7:
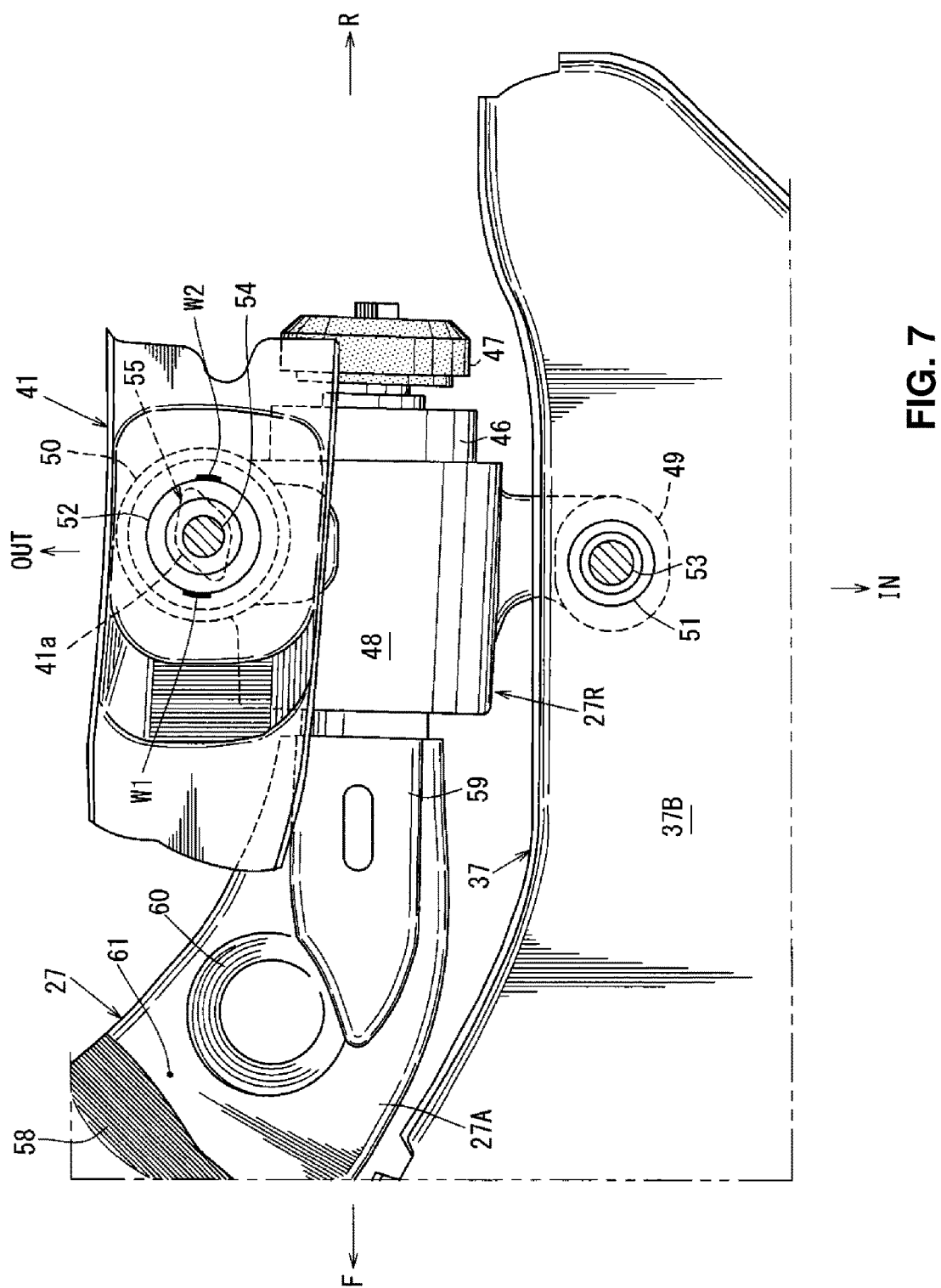
FIG. 7 is an enlarged plan view of a support structure which is positioned on a central side, in a vehicle longitudinal direction, of a lower arm.
Figure 8:
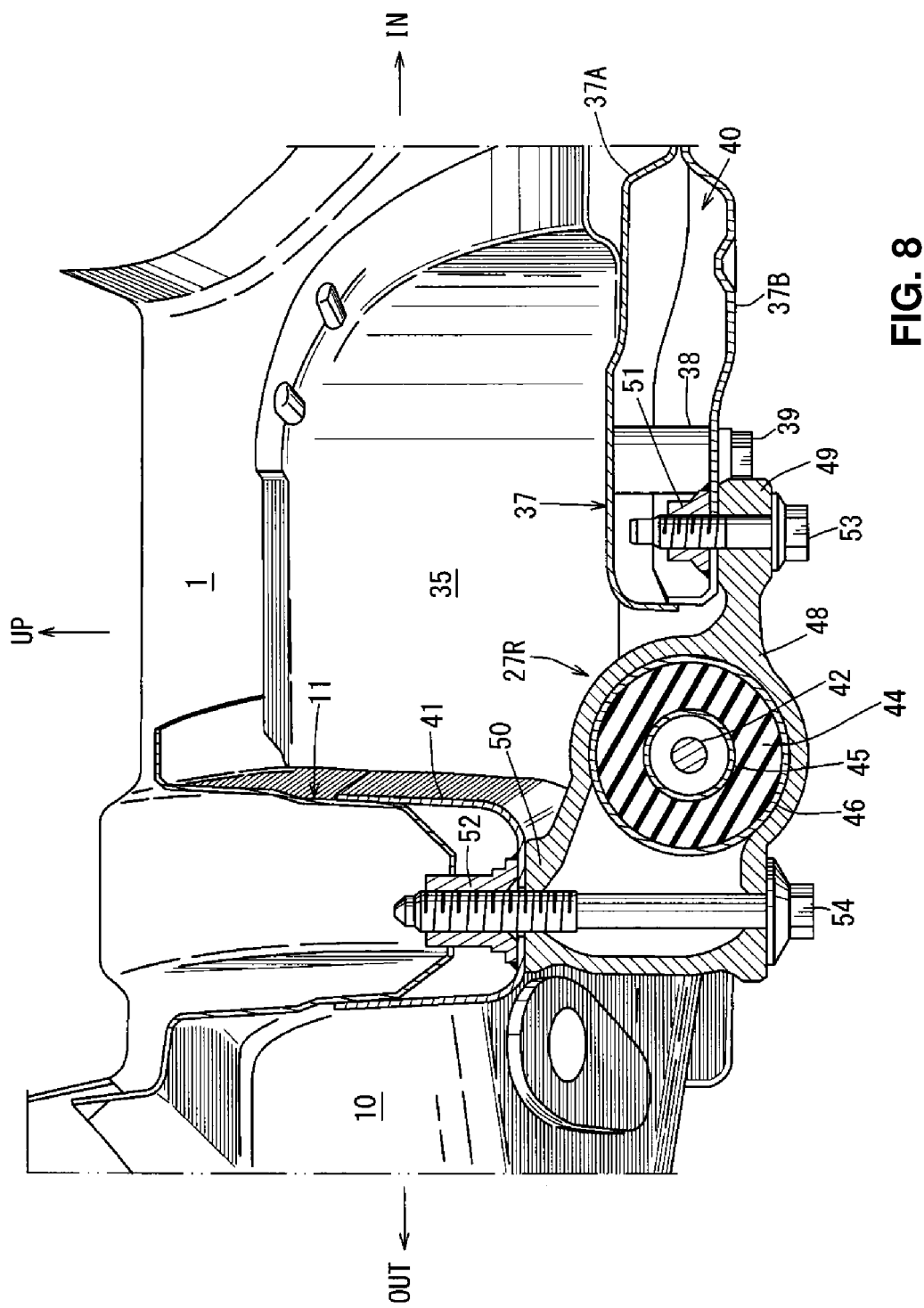
FIG. 8 is an enlarged main-part sectional view taken along line C-C of FIG. 5.
Figure 9:
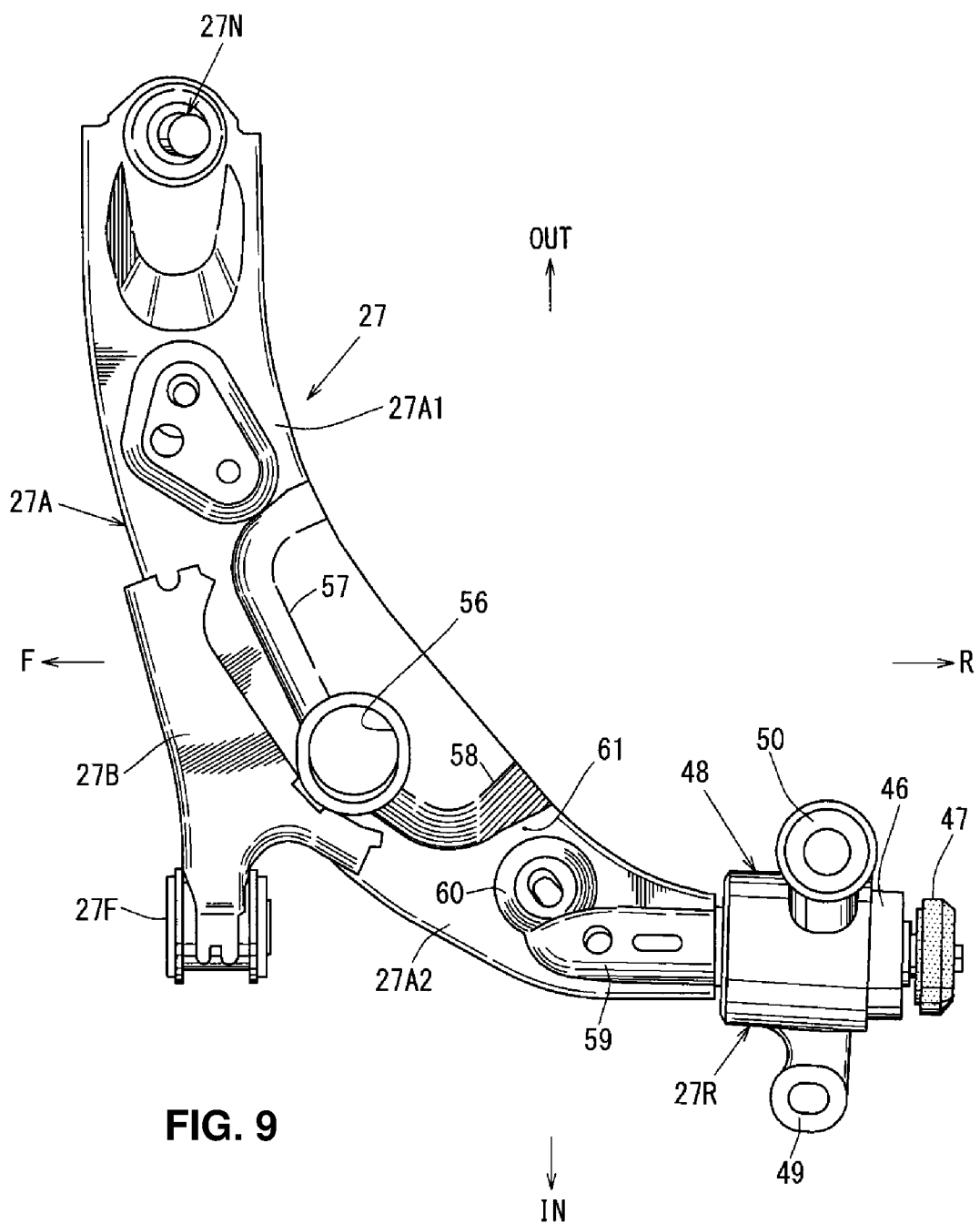
FIG. 9 is a plan view of the lower arm.
Figure 13:
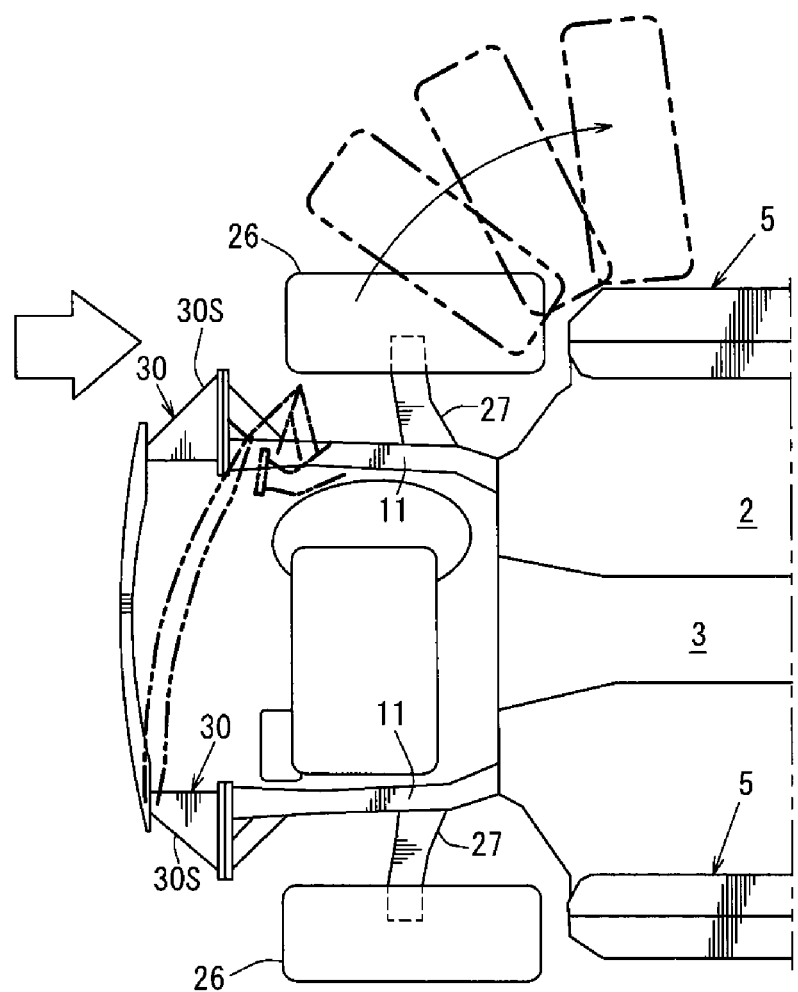
FIG. 13 is an explanatory diagram showing a move of the automotive vehicle of the present invention in a small overlap collision.
Figure 14:
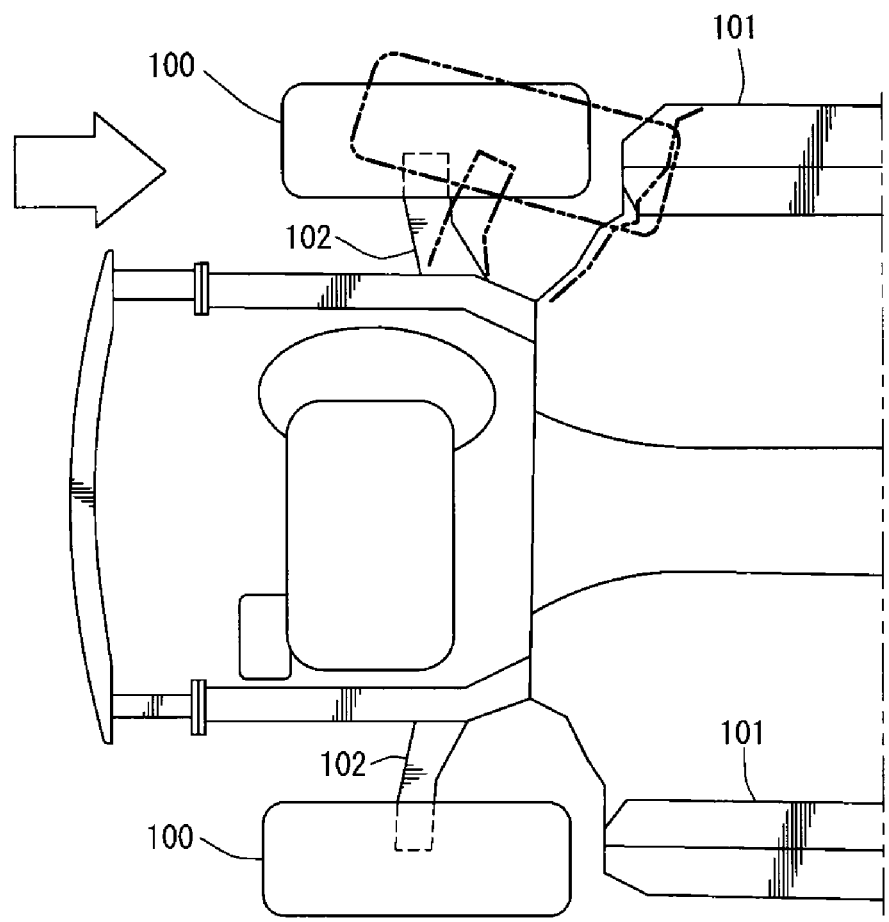
FIG. 14 is an explanatory diagram showing a move of a conventional automotive vehicle in a small overlap collision.

FIG. 5 is an enlarged main-part bottom view of the side vehicle-body structure shown in FIG. 1, FIG. 6 is a main-part side view of a front suspension, FIG. 7 is an enlarged plan view of the support structure which is positioned on a central side, in the vehicle longitudinal direction, of the lower arm 27, FIG. 8 is an enlarged main-part sectional view taken along line C-C of FIG. 5, FIG. 9 is a plan view of the lower arm 27 itself, and FIG. 13 is an explanatory diagram showing a move of the automotive vehicle of the present invention in the small overlap collision.

As shown in the bottom view of FIG. 5, uneven-shaped tunnel member 3*a* extending in the vehicle longitudinal direction are integrally formed at both sides, in the vehicle width direction, of the tunnel portion 3 (the right side of the tunnel portion 3 is illustrated only), and a tunnel lower member 35 is attached between a both-side front end portion of the tunnel portion 3 and a portion from a kick-up portion of the front side frame 1 to its rear portion.

Meanwhile, as shown in FIG. 5, the rear cross member 19 of the sub frame 15 comprises a rear center member 36 which extends in the vehicle width direction and rear side members 37 which are integrally provided at outward end portions, in the vehicle width direction, of the rear center member 36 and connect to the above-described longitudinal members 16.

The rear side member 37 is, as shown in FIG. 8, formed by an upper member 37A and a lower member 37B, and in the present embodiment, the both members 37A, 37B are fixed by a bolt 39 in a state in which a collar 38 is interposed between the upper and lower members 37A, 37B and a closed cross section 40 is formed between the upper member 37A and the lower member 37B.

Further, as shown in the main-part side view of the front suspension of FIG. 6, an upper portion of the knuckle 24 is connected to a lower portion of a shock absorber 90 extending vertically, and an upper portion of the shock absorber 90 is resiliently supported at an attachment portion 91 of a suspension tower portion 14 (a so-called strut tower) shown in FIG. 1. Also, as shown in FIGS. 5, 6, 7 and 8, a bracket 41 for a lower-arm attachment is fixedly welded to a lower portion of a kick-up portion 11k (see FIG. 6) of the front side frame 11.

Herein, as shown in FIG. 9 showing the lower arm 27 itself, the lower arm 27 is an A-shaped lower arm which comprises an arm body 27A which comprises a front-side lower arm portion 27A1 extending in the vehicle width direction and a rear-side arm portion 27A2 extending rearward, a front-side attaching bracket 27B welded to an inward side, in the vehicle width direction, of a front side of the arm body 27A, a front-side axial portion 27F as a tip-side axial portion positioned at the tip side in the vehicle longitudinal direction, a rear-side axial portion 27R as a central-side axial portion positioned at a central side in the vehicle longitudinal direction, and a connection portion 27N (a knuckle connection portion) connecting the knuckle 24 shown in FIG. 3.

The front-side axial portion 27F is provided at an inward side, in the vehicle width direction, of the bracket 27B, the rear-side axial portion 27R is provided at an inward-side rear end of the arm body 27A, and the knuckle connection portion 27N is provided at an outward-side end portion of the arm body 27A.

Further, in the present embodiment, as shown in FIG. 9, both of the front-side axial portion 27F and the rear-side axial portion 27R are configured such that their axial center line is arranged in the vehicle longitudinal direction. Herein, the knuckle 24 is, as shown in FIG. 6, configured such that its upper portion is connected to the attachment portion 91 (damper support portion) shown in FIG. 1 via the shock absorber 90, thereby constituting a strut type of suspension.

The above-described rear-side axial portion 27R comprises, as shown in FIG. 8, a lower arm pin 42, a rubber 44, an inner tube 45, an outer tube 46, and a dynamic damper 47, which is supported by a bracket 48 as a journal portion. The bracket 48 as the journal portion to support the rear-side axial portion 27R of the lower arm 27 comprises a pair of right-and-left fastening portions 49, 50.

As shown in FIGS. 7 and 8, nuts 51, 52 are fixedly welded to respective vehicle-body sides of the fastening portions 49, 50 in advance. As shown in these figures, the nut 51 to fasten the fastening portion 49 positioned on the inward side, in the vehicle width direction, of the vehicle is fixedly welded in advance in the closed cross section 40 of the lower member 37B of the rear side member 37, and the nut 52 to fasten the fastening portion 50 positioned on the outward side, in the vehicle width direction, of the vehicle is fixedly welded in advance to the bracket 41 attached to a lower portion of the kick-up portion of the front side frame 11.

The pair of right-and-left fastening portions 49, 50 are attached to the rear side member 37 and the bracket 41 with bolts 53, 54 for fastening the nuts 51, 52, respectively.

Herein, as shown in the plan view of FIG. 7, part of the whole periphery of the nut 52 is fixedly welded to the bracket 41 through welding portions W1, W2, and a bolt through hole 41a of the bracket 41 for inserting the bolt 54 is formed in a roughly diamond shape such that its front-and-rear both sharp ends are located away from the welding portions W1, W2 in a peripheral direction, whereby a separation promotion portion 55 to promote separation more than the inward-side fastening portion 49 is provided at the outward-side fastening portion 50.

Thereby, the support rigidity of the lower arm 27 in a normal state (not in the vehicle collision) is ensured by the pair of right-and-left fastening portions 49, 50. Meanwhile, when a collision load generating in the vehicle collision causes a crack to occur at a sharp portion of the bolt through hole 41a so that the bolt 54 comes out, the outward-side fastening portion 50 separates and consequently the lower arm 27 is allowed to swing rearward around the inward-side bolt 53.

As shown in FIG. 9, a service hole 56 for sub-frame attaching is formed at a central portion of the arm body 27A of the lower arm 27, and a protrusion-shaped reinforcing portion 57 which extends outward from an outward hole edge, in the vehicle width direction, of the service hole 56 and a protrusion-shaped reinforcing portion 58 which extends rearward from a rear hole edge are formed integrally.

Further, as shown in FIG. 9, a protrusion-shaped reinforcing portion 59 which extends forward from a rear end of the arm body 27A which is positioned right before the rear-side axial portion 27R and a reinforcing portion 60 which protrudes in roughly a truncated-cone shape continuously from an outward front portion of the reinforcing portion 59 are formed integrally. Further, between a rear end of the reinforcing portion 58 and a front end of the reinforcing portion 60 is formed a valley portion 61, the height (the width in the vertical direction) of which is relatively lower than that of the reinforcing portions 58, 60, and this valley portion 61 is configured such that a sectional secondary moment thereof is lower than that of the both reinforcing portions 58, 60 adjacent to the valley portion 61. Thus, the valley portion 61 serves as a deformation promotion portion. Herein, the above-described reinforcing portions 57-60 are, as shown in the bottom view of FIG. 5, formed integrally at a lower face of the arm body 27A of the lower arm 27, and the respective reinforcing portions 57-60 at the lower face of the arm body 27A are configured to protrude downward.

As described above, the valley portion 61 serving as the deformation promotion portion which is configured to deform inward when receiving the wheel collision load of the front wheel 26 is provided at the rear end portion of the rear-side arm portion 27A2 of the A-shaped lower arm 27. This valley portion 61 is formed by a vehicle-rear side end of the above-described reinforcing portion 58. The reinforcing portion 58 reconciles reinforcing of the service hole 56 and forming of the valley portion 61 serving as the deformation promotion portion, and the valley portion 61 of the vehicle-rear side end of the reinforcing portion 58 decreases its rigidity relatively, ensuring sufficiently the necessary rigidity in the normal vehicle traveling, so that the stress is concentrated on this portion in the vehicle collision, thereby deforming the lower arm 27 inward. Herein, the above-described valley portion 61 may have any shape as long as the stress can be concentrated, for example, the sectional secondary moment may be decreased locally or the low-rigidity material may be used locally by forming an opening, differentiating the thickness of the lower arm 27 or the height of the flange, or the like.

As shown in FIG. 9, the front-side attaching bracket 27B is attached by continuous welding such that it butts against the front-side axial portion 27F from the vehicle outside, so that the strength against a load directed to the vehicle inward side from the vehicle outward side or the longitudinal load is strong. Meanwhile, the strength against a load (tensional force) directed to the vehicle outside from the vehicle inward side is relatively weak because a load of the separation direction is applied to the welding portion, so that the front-side axial portion 27F of the lower arm 27 is configured such that its tensional rigidity is lower than that of the knuckle connection portion 27N.

As shown in FIG. 3, the above-described lower arm 27 is configured to have a size and shape such that it swings about the bolt 53 (see FIGS. 7 and 8) near the rear-side axial portion 27R after the front-side axial portion 27F is separated or breaks, specifically after the bracket 27B is separated from the front-side axial portion 27F or breaks, so that at least an outward side end of a rim portion 26a of the front wheel 26 can be displaced outward relative to the side sill 5 as shown by an imaginary line in FIG. 3.

Additionally, as shown in FIG. 3, the front wheel 26 includes the rim portion 26a, and a longitudinal gap g1 to allow the outward displacement of the front wheel 26 relative to the side sill 5 is formed between the rim portion 26a and a front end of the hinge pillar 4 or a front end of the side sill 5 as a vehicle-body member which is located in back of and close to the front wheel 26.

Accordingly, in the small overlap collision in which the collision object collides with the front wheel 26, the valley portion 61 at the rear end portion of the A-shaped lower arm 27 which serves as the deformation promotion portion causes the rear end portion of the lower arm 27 to bend and deform inward first. Next, the front-side axial portion 27F as the tip-side axial portion of the lower arm 27 is separated or breaks. Specifically, the rear end portion of the lower arm body 27A deforms inward and thereby the lower arm body 27A inclines backward, so that a relative position of the connection portion 27N to the front-side axial portion 27F changes rearward or a further rearward slide from its original position increases. Thereby, the tensional load which operates to pull the front-side axial portion 27F outward, which is caused by the rearward displacement of the front wheel 26, increases. Accordingly, the bracket 27B fixedly welded to the front-side axial portion 27F is separated or breaks, and then the lower arm 27 swings as shown by the imaginary line in FIG. 3. Further, in the present embodiment, as shown in FIGS. 3 and 13, the rim portion 26a contacts the front end of the hinge pillar 4 or an outward end of the front end of the side sill 5, and a reaction force generated by this contact causes the front wheel 26 to swing outward around the tip of the side sill 5 and be pushed outward relative to the side sill 5. That is, the front wheel 26 is displaced outward relative to the side sill 5, thereby generating a lateral load (reaction force). Thereby, it is prevented that the front wheel 26 is received at the front end of the side sill 5, and when the front wheel 26 is displaced outward relative to the side sill 5, the reaction force generates the lateral-slide load, so that it is prevented that the collision load is transmitted to the front end of the side sill 5 via the front wheel 26. Herein, since the front wheel 26 which has been displaced outward relative to the side sill 5 in the small overlap collision is coupled to the vehicle body via the lower arm 27 and the shock absorber 90 (see FIG. 6), the front wheel 26 swings more inward when being more pushed rearward by the collision load. Thereby, the front wheel 26 pushes the side sill 5 which is located in back of the hinge pillar 4 from vehicle outside with some pressing force as shown by an arrow in FIG. 3.

Herein, as shown in FIGS. 1, 2 and 3, the hinge pillar 4 is a vehicle-body rigidity member, which comprises a hinge pillar inner 62, a hinge pillar reinforcement 63, and a hinge pillar outer 64 which are joined together and has a hinge-pillar closed cross section 65 extending in the vehicle vertical direction. The outside of the hinge pillar 4 and the side sill 5 is covered with a body side panel 66 as shown in FIGS. 2 and 3.

Figure 10:
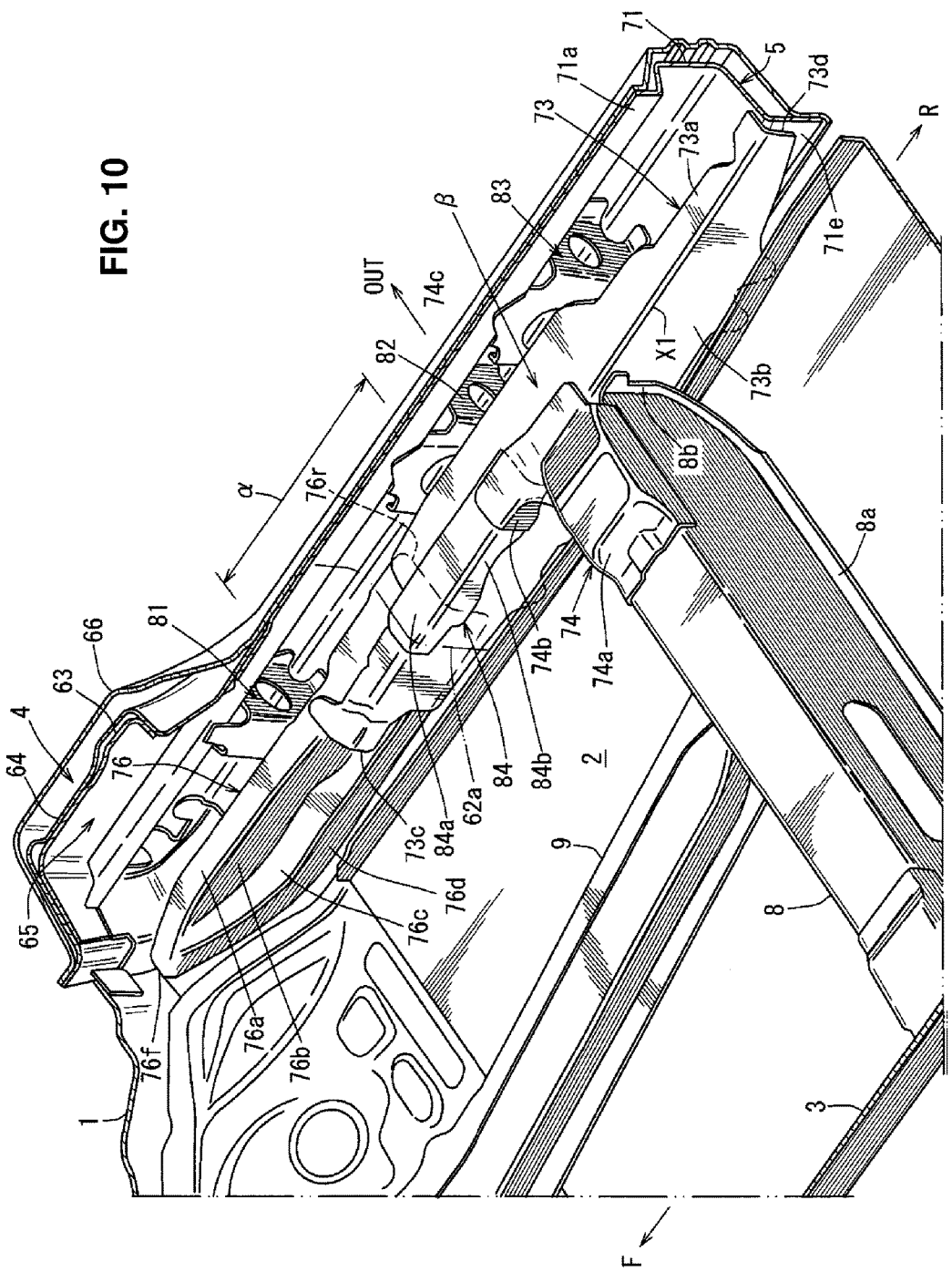
FIG. 10 is a perspective view of the side vehicle-body structure, in which a hinge pillar inner and a side sill inner are removed.
Figure 11:
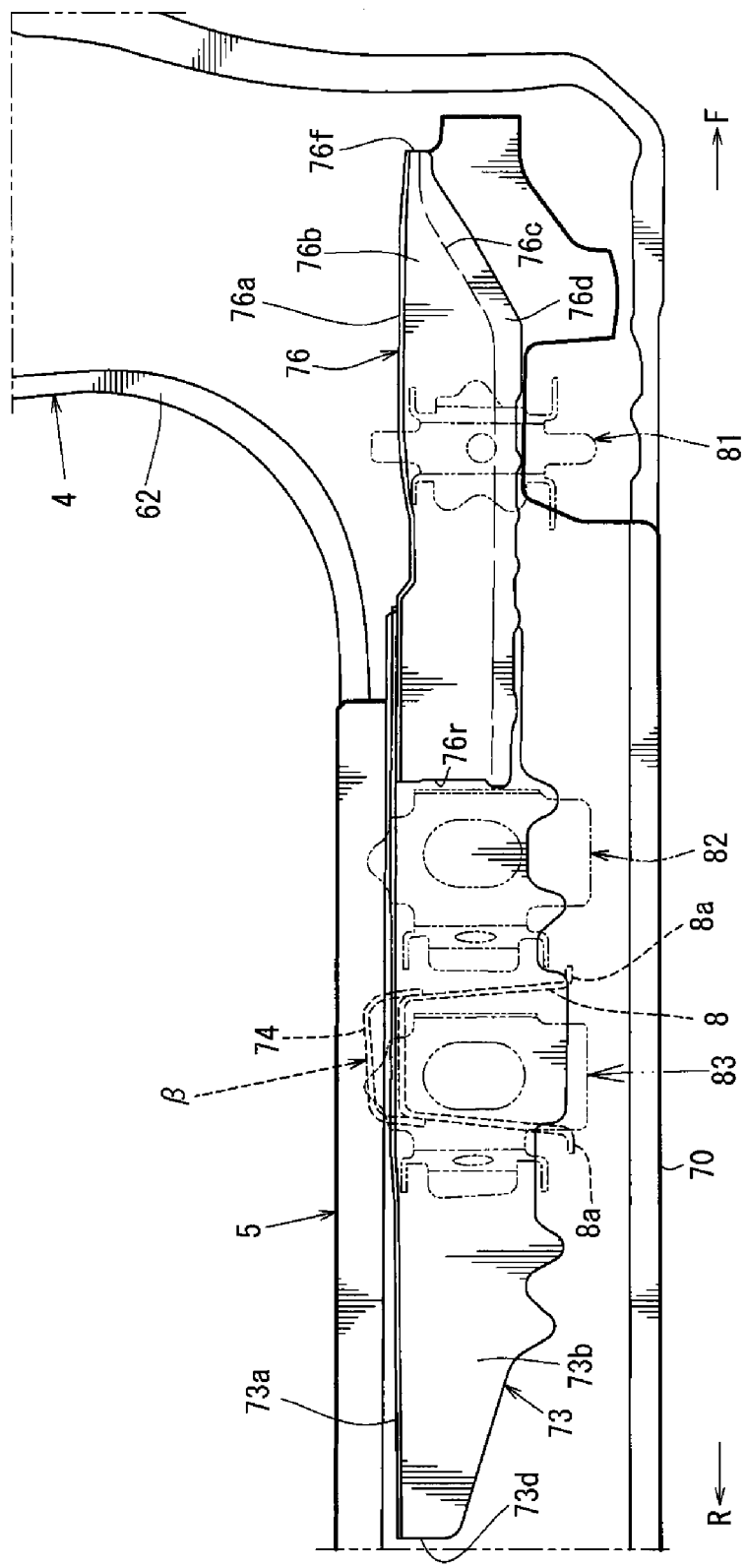
FIG. 11 is a side view of the side vehicle-body structure, in which a body side panel, a hinge pillar outer, and a side sill outer are removed, when viewed from the outside of the vehicle.
Figure 12:
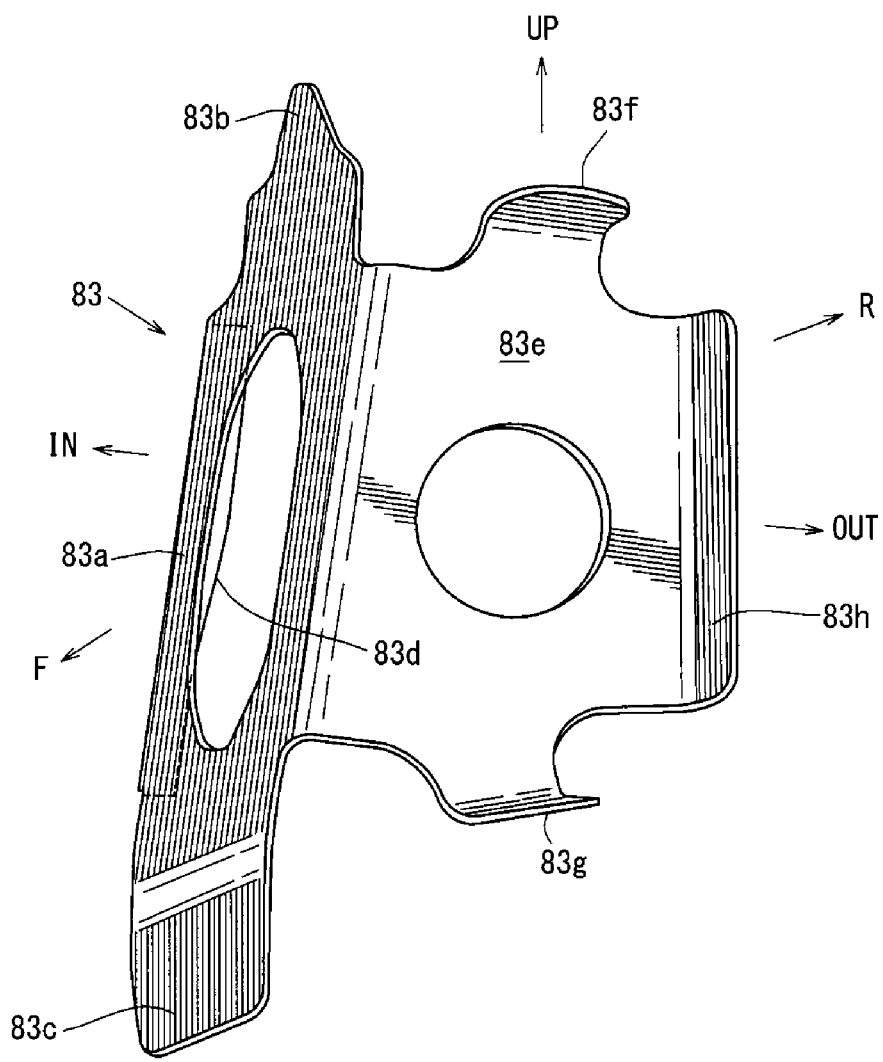
FIG. 12 is a perspective view of a partition member which forms a reinforcing portion.

FIG. 10 is a perspective view of the side vehicle-body structure, in which the hinge pillar inner 62 and a side sill inner 70 are removed, FIG. 11 is a side view of the side vehicle-body structure, in which the body side panel 66, the hinge pillar outer 64, and a side sill outer 71 are removed, when viewed from the outside of the vehicle, and FIG. 12 is a perspective view of a partition member which forms a reinforcing portion.

As shown in FIGS. 4A and 4B, the side sill 5 is a vehicle-body strength member, which comprises the side sill inner 70 and the side sill outer 71 which are joined together and has a side-sill closed cross section 72 extending in the vehicle longitudinal direction.

As shown in FIGS. 4B and 10, a rear-side reinforcement 73 as a reinforcement which has a ridgeline X1 at its corner portion is provided along an outward side face, in the vehicle width direction, of the side sill inner 70, i.e., an upper portion of a face of the side sill inner 70 which is positioned on the side of the side-sill closed cross section 72.

As shown in the same figures, the rear-side reinforcement 73 is formed in an inverse-L shape by an upper side portion 73a which extends along an upper side portion 70a of the side sill inner 70 and a vertical wall portion 73b which extends along a vertical wall portion 70b of the side sill inner 70, and has the ridgeline X1 extending in the vehicle longitudinal direction at a corner portion between the upper side portion 73a and the vertical wall portion 73b. The rear-side reinforcement 73 extends in the vehicle longitudinal direction from its front end 73c to its rear end 73d as shown in FIG. 10.

Meanwhile, as shown in FIGS. 4B and 10, the above-described cross member 8 is configured to have a hat-shaped cross section, and its longitudinal joint flange portion 8a is fixedly joined to the floor panel 2 and its lateral joint flange portion 8b is fixedly joined to the vertical wall portion 70b of the side sill inner 70.

As shown in FIG. 10, an upper side of the outward end portion, in the vehicle width direction, of the cross member 8 and the side sill inner 70 are fixedly connected via a connecting bracket 74 which has an L shape in the plan view. This connecting bracket 74 is a load absorbing bracket which is formed in an L shape in the plan view by a vehicle-width-direction portion 74a which extends in the vehicle width direction and has a gate-shaped cross section and a vehicle-longitudinal-direction portion 74b which extends in the vehicle longitudinal direction and has an inverse-L shaped cross section.

The rear-side reinforcement 73 is provided, as shown in FIG. 4B, such that the reinforcement ridgeline X1 of this reinforcement 73 and a side-sill-inner upper ridgeline X2 of the side sill inner 70 extend in the vehicle longitudinal direction and overlap with each other over a range from a specified area α (see FIG. 10) where the front wheel 26 outward displaced in the vehicle collision is capable of contacting the side sill 5 to a cross-member connection portion β (where the cross member 8 connects to the side sill inner 70 via the bracket 74 as shown in FIG. 10).

Herein, the above-described specified area α may be preferably an area which has a high likelihood of contacting of the front wheel 26 with the side sill 5 and has a relatively low rigidity in the vehicle width direction, that is, for example, a middle portion, in the vehicle longitudinal direction, between the torque box 10 and the cross member 8 or the like.

Thereby, the shearing rigidity, in the vehicle width direction, of the above-described range from the specified area α to the cross-member connection portion β is increased, so that the longitudinal deformation of the vehicle compartment is suppressed, receiving the front wheel 26 at a side face of the side sill 5, not at a face of the tip of the side sill 5, in the small overlap collision.

As shown in FIGS. 4A and 10, there is provided a front-side reinforcement 76 as another reinforcement which has a closed cross section 75 formed between this reinforcement and the side sill inner 70 and extending from the tip portion, i.e., the front end portion of the side sill 5 to a front end portion of the above-described rear-side reinforcement 73.

As shown in FIGS. 4A and 10, the front-side reinforcement 76 comprises an upper joint flange 76a which is joined to the upper side portion 70a of the side sill inner 70, a vertical wall portion 76b which extends downward from an inward end of the upper joint flange 76a, a bottom wall portion 76c which extends roughly inward from a lower end of the vertical wall portion 76b, and a lower joint flange 76d which extends downward from an inward end of the bottom wall portion 76c and is joined to the vertical wall portion 70b of the side sill inner 70, which are formed integrally. The longitudinal proof stress of the side sill inner 70 is increased by the closed cross section 75 formed between the side sill inner 70 and the front-side reinforcement 76. Further, a front portion of the closed cross section 75 formed by the front-side reinforcement 76 and the side sill inner 70 is connected to the hinge-pillar closed cross section 65 and a closed cross section which is formed by the torque box 10 and the dash lower 1, thereby improving the load dispersion performance.

As shown in FIG. 10, the front-side reinforcement 76 extends in the vehicle longitudinal direction from its front end 76f to its rear end 76f, and a rear portion of the front-side reinforcement 76 and a front portion of the rear-side reinforcement 73 are connected together, having a specified amount of overlapping in the vehicle longitudinal direction, therebetween at the specified area α of the high likelihood of contacting.

The shearing rigidity is further increased by connecting the front-side reinforcement 76 and the rear-side reinforcement 73 at the above-described specified area α as described above.

As shown in FIGS. 4A and 4B, the side sill outer 71 comprises an upper joint flange 71a, an upper side portion 71b, a vertical wall portion 71c, a lower side portion 71d, and a lower joint flange 71e. As shown in FIG. 4A, reinforcing reinforcements 77, 78 are fixedly joined to an upper portion and a lower portion of the outward side face of the side sill outer 71.

The upper-side reinforcing reinforcement 77 shown in FIG. 4A is formed in an inverse-L shape by an upper side portion 77b and a vertical wall portion 77c which extend along the upper side portion 71b and the vertical wall portion 71c of the side sill outer 71.

The lower-side reinforcing reinforcement 78 shown in FIG. 4A is formed in an L shape by a vertical wall portion 78c and a lower side portion 78d which extend along the vertical wall portion 71c and the lower side portion 71d of the side sill outer 71.

Further, as shown in FIG. 4B, the reinforcing reinforcement 79 is fixedly joined to the upper portion of the outward side face of the side sill outer 71 at the cross-member connection portion β. As shown in the same figure, this reinforcing reinforcement 79 is formed in an inverse-L shape by an upper side portion 79b and a vertical wall portion 79c which extend along the upper side portion 71b and the vertical wall portion 71c of the side sill outer 71. The rigidity improvement of the side sill outer 71 is achieved by the above-described reinforcing reinforcements 77, 78, 79. Herein, the two reinforcing reinforcements 77, 79 among the above-described reinforcing reinforcements 77, 78, 79 may be formed integrally in the vehicle longitudinal direction or separately from each other.

As shown in FIGS. 4B, 10 and 11, plural partition members 81, 82, 83, as a reinforcing portion which is spaced apart, in the vehicle width direction, from an outward end portion of the upper side portion 73a of the rear-side reinforcement 73 and reinforces the side-sill closed cross section 72, are provided at the side sill outer 71 at intervals in the vehicle longitudinal direction.

Thereby, crushing of the side-sill closed cross section 72 is controlled with the rear-side reinforcement 73, that is, deformation or crushing of the above-described two overlapped ridgelines X1, X2 are suppressed, so that absorbing of an impact is achieved by the distance between the partition members 81, 82, 83 and the outward end portion of the upper side portion 73a of the rear-side reinforcement 73 and a load-absorption deformation of the respective partition members 81, 82, 83 themselves.

As shown in FIG. 10, these partition members 81, 82, 83 are fixedly joined only to the side sill outer 71. Herein, since the two partition members 82, 83 among the partition members 81, 82, 83 are formed in the same structure, the structure of the partition member 83 will be described referred to FIG. 12.

As shown in FIG. 12, the partition member 83 comprises an inner side portion 83a, flange portions 83b, 83c which extend vertically from the inner side portion 83a and are fixedly joined to the upper joint flange 71a and the lower joint flange 71e of the side sill outer 71, front and rear side portions 83d, 83e which bend outward from both ends, in the longitudinal direction, of the inner side portion 83a, a flange portion 83f which bends rearward from an upper end of the rear side portion 83e, a flange portion 83g which bends rearward from a lower end of the rear side portion 83e and is fixedly joined to the lower side portion 71d of the side sill outer 71, and a flange portion 83h which bends rearward from an outward end of the rear side portion 83e and is fixedly joined to the vertical wall portion 71c of the side sill outer 71, which are formed integrally.

The partition member 82 has the same structure as the partition member 83 shown in FIG. 12. The partition member 81 has its inner side portion, a longitudinal length of which is shorter than that of the partition members 82, 83, and this member 81 comprises elements which correspond to the respective elements 83e-83h of the partition member 83.

Herein, as shown in FIGS. 10 and 4B, the connecting bracket 74 as a load-absorption bracket is provided to extend between the upper ridgeline X2 of the side sill inner 70 and the cross member 8. Thereby, a load laterally inputting to the side sill 5 is received at the high rigidity and also the load absorption is achieved at a gap (distance) between the outward end 74c of the connecting bracket 74 and the upper joint flange 5a (see FIG. 4B) of the side sill 5.

Further, as shown in FIGS. 10 and 4A, the hinge pillar inner 62 and the side sill inner 70 are overlapped with a specified longitudinal amount (length) at the above-described specified area α of the high likelihood of contacting of the front wheel 26 having been displaced outward with the side sill 5. In FIG. 10, a rear end 62a of the hinge pillar inner 62 is illustrated by an imaginary line. Thereby, improving of the proof stress of a contact portion of the side sill 5 with the front wheel 26 is further achieved. Further, the sufficient rigidity is ensured by the overlapping structure of the hinge pillar inner 62 and the side sill inner 70, without using a panel member having a large plate-thickness, so that ensuring of the workability and ensuring of the sufficient rigidity is compatibly achieved.

Moreover, as shown in FIG. 10, a gusset 84 extending in the vehicle longitudinal direction is provided at the upper ridgeline X2 of the side sill inner 70 (see FIG. 4) to extend along the upper portion of the inward side of that over a range from the overlapping portion of the hinge pillar inner 62 and the side sill inner 70 to the cross-member connection portion β.

This gusset 84 is formed in an inverse-L shape by an upper side portion 84a which extends along the upper side portion 70a of the side sill inner 70 and a vertical wall portion 84b which extends along the vertical wall portion 70b of the side sill inner 70 as shown in FIG. 10. The above-described gusset 84 reinforces the upper ridgeline X2 of the side sill inner 70 (see FIG. 4) and promotes the load transmission to the cross member 8. Herein, in the figures, an arrow F denotes a vehicle front side, an arrow R denotes a vehicle rear side, an arrow IN denotes a vehicle inward side, an arrow OUT denotes a vehicle outward side, and an arrow UP denotes a vehicle upward side.

As described above, the side vehicle-body structure of the automotive vehicle of the above-described embodiment, in which the wheel (see the front wheel 26) is configured to be displaced outward relative to the side sill 5 when the support member (see the lower arm 27) which supports the wheel (the front wheel 26) at the vehicle body swings rearward in the vehicle collision, the side vehicle-body structure comprising the side sill inner 70 forming the inward-side member of the side sill 5, the side sill inner 70 being configured to have the corner portion extending in the vehicle longitudinal direction which is formed by the upper side portion 70a and the vertical side portion 70b, the corner portion of the side sill inner 70 forming the side-sill-inner upper ridgeline X2 extending in the vehicle longitudinal direction, the cross member 8 provided to extend in the vehicle width direction and connecting to the portion β of the side sill inner 70 at its outward-side end, and the reinforcement (see the rear-side reinforcement 73) provided at the upper portion of the outward side face, in the vehicle width direction, of the side sill inner 70 along the corner portion of the side sill inner 70, wherein the reinforcement (the rear-side reinforcement 73) is configured to have the corner portion corresponding to the corner portion of the side sill inner 70, the corner portion of the reinforcement (the rear-side reinforcement 73) forming the reinforcement ridgeline X1 extending in the vehicle longitudinal direction, and the reinforcement (the rear-side reinforcement 73) is provided such that the reinforcement ridgeline X1 formed at the corner portion of the reinforcement (the rear-side reinforcement 73) and the side-sill-inner upper ridgeline X2 formed at the corner portion of the side sill inner 70 overlap with each other over the range from the specified area α where the wheel (the front wheel 26) outward displaced in the vehicle collision is capable of contacting the side sill 5 to the connection portion β where the cross member 8 connects to the side sill inner 70 (see FIGS. 3, 4 and 10).

According to the present embodiment, since the reinforcement (the rear-side reinforcement 73) is provided such that the reinforcement ridgeline X1 formed at the corner portion of the reinforcement (the rear-side reinforcement 73) and the side-sill-inner upper ridgeline X2 formed at the corner portion of the side sill inner 70 overlap with each other over the range from the specified area α where the wheel (the front wheel 26) outward displaced in the vehicle collision is capable of contacting the side sill 5 to the connection portion β where the cross member 8 connects to the side sill inner 70, the shearing rigidity of the above-described range from the specified area α to the cross-member connection portion β can be increased. Accordingly, the longitudinal deformation of the vehicle body can be suppressed by receiving the wheel (the front wheel 26) at the side face of the side sill 5, not at the face of the tip of the side sill 5, in the small overlap collision.

Herein, since a relative speed, in the vehicle width direction, between the vehicle and the collision object is extremely lower than that, in the vehicle longitudinal direction, between the vehicle and the collision object, the vehicle body can be made to laterally slide relative to the collision object with a smaller kinematic energy than a case in which the relative speed, in the vehicle longitudinal direction, between the vehicle and the collision object is made a zero speed. Therefore, merely by reinforcing the range of the ridgeline from the above-described specified area α of the side sill inner 70 to the cross-member connection portion β, it can be effectively promoted to make the vehicle body laterally slide relatively by using the reaction force of receiving the wheel at the side face of the side sill 5, thereby suppressing the inward deformation of the vehicle compartment.

In the embodiment of the present invention, the other reinforcement (the front-side reinforcement 76) is provided to extend from the front end portion of the side sill 5 to the front end portion of the reinforcement (the rear-side reinforcement 73) such that the closed cross section 75 extending in the vehicle longitudinal direction is formed between the other reinforcement (the front-side reinforcement 76) and the side sill inner 70 (see FIGS. 4 and 10).

According to this embodiment, the longitudinal proof stress of the side sill inner 70 can be increased by the closed cross section 75 which is formed between the side sill inner 70 and the other reinforcement (the front-side reinforcement 76).

Further, in the embodiment of the present invention, the reinforcement (the rear-side reinforcement 73) and the other reinforcement (the front-side reinforcement 76) are connected to each other at the specified area α where the wheel outward displaced in the vehicle collision is capable of contacting the side sill 5 (see FIG. 10).

According to this embodiment, since the both reinforcements (the rear-side and front-side reinforcements 73, 76) are connected to each other at the specified area α, the shearing rigidity can be further increased.

Moreover, in the embodiment of the present invention, the side sill 5 is configured to have the closed cross section (the side-sill closed cross section 72) extending in the vehicle longitudinal direction which is formed by the side sill inner 70 and the side sill outer 71, and the reinforcing portion (see the partition members 81, 82, 83) is provided at the side sill outer 71 such that the reinforcing portion is spaced apart, in the vehicle width direction, from the reinforcement (the rear-side reinforcement 73) so as to reinforce the closed cross section (the side-sill closed cross section 72) (see FIGS. 4 and 10).

According to this embodiment, since the side sill outer 71 is reinforced by the reinforcing portion (the partition members 81, 82, 83) being spaced apart from the reinforcement (the rear-side reinforcement 73), crushing of the side-sill closed cross section 72 can be controlled with the reinforcement (the rear-side reinforcement 73), that is, deformation or crushing of the above-described two overlapped ridgelines X1, X2 can be suppressed, and also absorbing of the impact and producing of the lateral-slide load can be effectively achieved.

Additionally, in the embodiment of the present invention, the support member comprises the A-shaped lower arm 27 including the lower arm body (the arm body 27A) to support the wheel (the front wheel 26), and the deformation promotion portion (the valley portion 61) which is configured to deform inward when receiving the wheel collision load is provided at the end portion of the central side, in the vehicle longitudinal direction, of the lower arm body (the arm body 27A) such that after the tip-side axial portion (the front-side axial portion 27F) is separated from the lower arm 27 or the lower arm 27 breaks in the collision, the lower arm 27 swings about the vicinity of the central-side axial portion (the rear-side axial portion 27R) so as to displace the wheel (the front wheel 26) outward relative to the side sill 5 (see FIGS. 3 and 9).

According to this embodiment, when the collision object hits against the wheel (the front wheel 26) in the small overlap collision, the above-described central-side end portion of the A-shaped lower arm 27 deforms inward because of the deformation promotion portion (the valley portion 61) first, and then the tip-side axial portion (the front-side axial portion 27F) is separated from the lower arm 27 or the lower arm 27 breaks. After this, the lower arm 27 swings and thereby the wheel (the front wheel 26) is displaced outward relative to the side sill 5, so that the lateral load (the reaction force) is generated. Thus, when the wheel (the front wheel 26) is displaced outward relative to the side sill 5 without being received at the tip of the side sill 5, the lateral-slide load is generated by the reaction force, so that it is prevented that the collision load is transmitted to the tip of the side sill through the wheel (the front wheel 26). Accordingly, in the above-described collision, the wheel (the front wheel 26) can be displaced outward surely, preventing the wheel (the front wheel 26) from hitting against the tip of the side sill 5, and also the lateral-slide load of the vehicle body is generated, so that the vehicle body can be made laterally slide relative to the collision object.

In correspondence of the present invention to the above-described embodiments, the wheel of the present invention corresponds to the front wheel 26 of the embodiment. Likewise, the support member corresponds to the lower arm 27, the reinforcement corresponds to the rear-side reinforcement 73, the other reinforcement corresponds to the front-side reinforcement 76, the closed cross section which is formed by the side sill inner and the side sill outer corresponds to the side-sill closed cross section 72, the reinforcing portion corresponds to the valley portion 61, the tip-side axial portion corresponds to the front-side axial portion 27F, and the central-side axial portion corresponds to the rear-side axial portion 27R. However, the present invention is not to be limited to the above-described embodiment.

For example, while the above-described embodiment exemplified a case in which the side vehicle-body structure of the automotive vehicle is applied to the vehicle front portion, it is applicable to a vehicle rear portion. Further, while the A-shaped lower arm 27 was exemplified as the arm to support the wheel at the vehicle body, any other suspension arms, such as an I-shaped arm or multi-links, are applicable. Moreover, the lateral-slide promotion means may be provided at the tip portion of the vehicle body, such as the sub crash can 30 or the inclination member which transmit the collision load inward to the vehicle body. Thereby, the lateral-slide displacement starts from an initial stage of the small overlap collision, so that the inward deformation of the vehicle compartment when the wheel presses against the side sill from the side can be further suppressed, and also the direct collision of the collision object with the tip portion of the vehicle compartment, such as the hinge pillar or the side sill can be effectively suppressed.

What is claimed is:

1. A side vehicle-body structure of an automotive vehicle, in which a wheel is configured to be displaced outward relative to a side sill when a support member which supports the wheel at a vehicle body swings rearward in a vehicle collision, the side vehicle-body structure comprising:

a side sill inner forming an inward-side member of the side sill, the side sill inner being configured to have a corner portion extending in a vehicle longitudinal direction which is formed by an upper side portion and a vertical side portion thereof, the corner portion of the side sill inner forming a side-sill-inner upper ridgeline extending in the vehicle longitudinal direction;

a cross member provided to extend in the vehicle width direction and connecting to a portion of the side sill inner at an outward-side end thereof; and a reinforcement provided at an upper portion of an outward side face, in a vehicle width direction, of the side sill inner along the corner portion of the side sill inner, wherein said reinforcement is configured to have a corner portion corresponding to the corner portion of the side sill inner, the corner portion of the reinforcement forming a reinforcement ridgeline extending in the vehicle longitudinal direction, and said reinforcement is provided such that the reinforcement ridgeline formed at the corner portion of the reinforcement and the side-sill-inner upper ridgeline formed at the corner portion of the side sill inner overlap with each other over a range from a specified area where the wheel outward displaced in the vehicle collision is capable of contacting the side sill to a connection portion where said cross member connects to the side sill inner.

2. The side vehicle-body structure of the automotive vehicle of claim 1, wherein another reinforcement is provided to extend from a front end portion of the side sill to a front end portion of said reinforcement such that a closed cross section extending in the vehicle longitudinal direction is formed between said other reinforcement and said side sill inner.

3. The side vehicle-body structure of the automotive vehicle of claim 2, wherein said reinforcement and said other reinforcement are connected to each other at said specified area where the wheel outward displaced in the vehicle collision is capable of contacting the side sill.

4. The side vehicle-body structure of the automotive vehicle of claim 3, wherein the side sill is configured to have a closed cross section extending in the vehicle longitudinal direction which is formed by said side sill inner and a side sill outer, and a reinforcing portion is provided at said side sill outer such that the reinforcing portion is spaced apart, in the vehicle width direction, from said reinforcement so as to reinforce said closed cross section of the side sill.

5. The side vehicle-body structure of the automotive vehicle of claim 4, wherein the support member comprises an A-shaped lower arm including a lower arm body to support the wheel, a deformation promotion portion which is configured to deform inward when receiving a wheel collision load is provided at an end portion of a central side, in the vehicle longitudinal direction, of the lower arm body such that after a tip-side axial portion is separated from the lower arm or the lower arm breaks in the vehicle collision, the lower arm swings about the vicinity of a central-side axial portion so as to displace the wheel outward relative to the side sill.

6. The side vehicle-body structure of the automotive vehicle of claim 1, wherein the side sill is configured to have a closed cross section extending in the vehicle longitudinal direction which is formed by said side sill inner and a side sill outer, and a reinforcing portion is provided at said side sill outer such that the reinforcing portion is spaced apart, in the vehicle width direction, from said reinforcement so as to reinforce said closed cross section of the side sill.

7. The side vehicle-body structure of the automotive vehicle of claim 6, wherein the support member comprises an A-shaped lower arm including a lower arm body to support the wheel, a deformation promotion portion which is configured to deform inward when receiving a wheel collision load is provided at an end portion of a central side, in the vehicle longitudinal direction, of the lower arm body such that after a tip-side axial portion is separated from the lower arm or the lower arm breaks in the vehicle collision, the lower arm swings about the vicinity of a central-side axial portion so as to displace the wheel outward relative to the side sill.

8. The side vehicle-body structure of the automotive vehicle of claim 1, wherein the support member comprises an A-shaped lower arm including a lower arm body to support the wheel, a deformation promotion portion which is configured to deform inward when receiving a wheel collision load is provided at an end portion of a central side, in the vehicle longitudinal direction, of the lower arm body such that after a tip-side axial portion is separated from the lower arm or the lower arm breaks in the vehicle collision, the lower arm swings about the vicinity of a central-side axial portion so as to displace the wheel outward relative to the side sill.

* * * * *